(12) United States Patent
Obinata (10) Patent No.: US 7,701,642 B2
(45) Date of Patent: Apr. 20, 2010

(54) LIQUID LENS

(75) Inventor: Mariko Obinata, Kanagawa (JP)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 11/558,111

(22) Filed: Nov. 9, 2006

(65) Prior Publication Data

US 2007/0127102 A1    Jun. 7, 2007

(30) Foreign Application Priority Data

Dec. 2, 2005    (JP) .......................... P2005-348765

(51) Int. Cl.
  *G02B 3/12*  (2006.01)
  *G02B 1/06*  (2006.01)
(52) U.S. Cl. ..................................... 359/665
(58) Field of Classification Search .......... 359/665–667
  See application file for complete search history.

(56) References Cited

U.S. PATENT DOCUMENTS

| 5,519,539 | A  | * | 5/1996 | Hoopman et al. | ............ 359/741 |
| 6,369,954 | B1 | * | 4/2002 | Berge et al.  | ................. 359/666 |
| 2006/0245072 | A1 | * | 11/2006 | Venema | ...................... 359/666 |
| 2006/0279848 | A1 | * | 12/2006 | Kuiper et al. | ................ 359/666 |
| 2007/0030553 | A1 | * | 2/2007 | Hendriks et al. | ............. 359/245 |

FOREIGN PATENT DOCUMENTS

| JP | 2000-356708 | 12/2000 |
| JP | 2002-540464 | 11/2002 |

* cited by examiner

*Primary Examiner*—Darryl J Collins
(74) *Attorney, Agent, or Firm*—K&L Gates LLP (57) ABSTRACT

There is provided a liquid lens in which a voltage is applied to control the shape of the interface between a polar liquid and a nonpolar liquid so as to control a transmitted light path at the interface. The liquid lens has a cavity with a polygonal upper side, into which the polar liquid and the nonpolar liquid are injected to form the interface.

8 Claims, 12 Drawing Sheets

LIQUID LENS

CROSS REFERENCES TO RELATED APPLICATIONS

The present application claims priority to Japanese Patent Application JP2005-348765 filed in the Japanese Patent Office on Dec. 2, 2005, the entire contents of which is being incorporated herein by reference.

BACKGROUND

The present disclosure relates to a liquid lens and particularly to a liquid lens with improved transmittance and light collection efficiency.

There are variable-focus liquid lenses of related art that use change in interface between two liquids whose wettability is changed by voltage application so as to change the focal length. For such variable-focus liquid lenses of related art, there has been proposed a method for forming a cavity to center the liquids, as shown in FIG. 1A (see JP-T-2002-540464, for example).

Figure 1A:
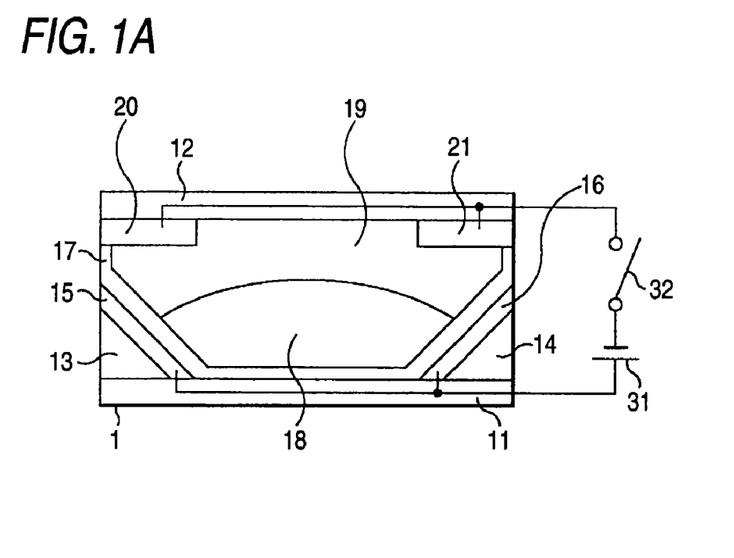
FIGS. 1A to 1C explain an exemplary configuration of a variable-focus liquid lens of related art.

As shown in FIG. 1A, a liquid lens 1 includes ribs 13 and 14, lower electrodes 15 and 16, an insulating film 17, a nonpolar liquid 18, a polar liquid 19, and upper electrodes 20 and 21 in the space between a transparent substrate 11 and a transparent top plate 12. The upper electrodes 20, 21 and the lower electrodes 15, 16 of the liquid lens 1 are connected via a power supply 31 and a switch 32. That is, when the switch 32 is turned on, a voltage from the power supply 31 is applied between the upper electrodes 20, 21 and the lower electrodes 15, 16. This voltage application changes the wettability of the nonpolar liquid 19, so that the shape of the interface between the nonpolar liquid 18 and the polar liquid 19 is changed and shaped into a curved convex lens. This shape of the interface focuses light that passes through the two-liquid layer. The curvature of the interface between the two liquids can be adjusted by adjusting the value of the applied voltage, allowing the focal length of the liquid lens 1 to be changed.

Figure 1B:
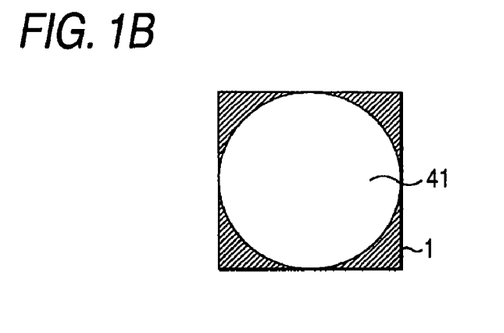

JP-T-2002-540464 describes how to center the liquids by forming and using a center-axis symmetric truncated cone-shaped cavity or an elongated groove-shaped cavity. That is, as shown in FIG. 1B, a circular cavity 41 is formed when the liquid lens 1 shown in FIG. 1A is viewed from the transparent top plate 12 side.

Figure 1C:
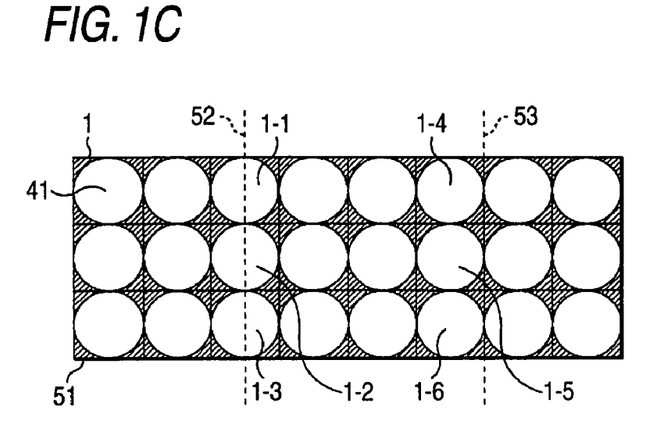

There has been also proposed a method for arranging such variable-focus liquid lenses of the related art in an array for use, as shown in FIG. 1C (see JP-A-2000-356708, for example).

For example, liquid lenses 1, each having a cavity 41 with a circular upper side, as described in JP-T-2002-540464 are arranged in an array as described in JP-A-2000-356708, so as to form a liquid lens array 51 as shown in FIG. 1C.

Figure 2A:
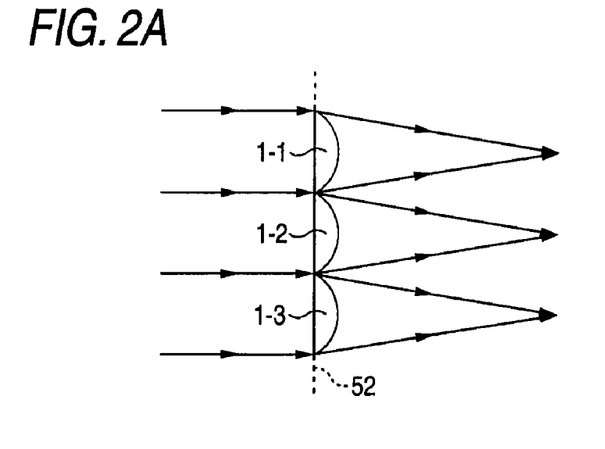
FIGS. 2A to 2C explain how light transmits the variable-focus liquid lens of related art.

When light enters the liquid lens array 51, part of the light enters the portion indicated by the dotted line 52, passes through the liquid lenses 1-1 to 1-3, and is focused as indicated by the arrows shown in FIG. 2A.

Figure 2B:
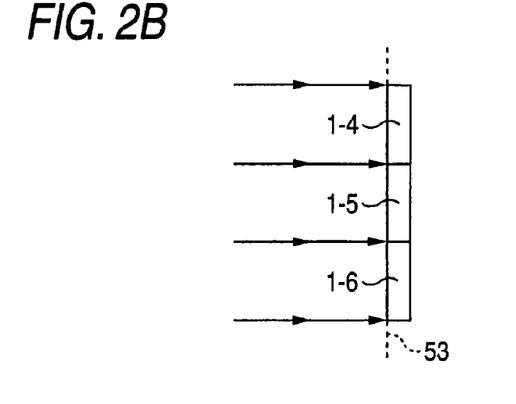

However, among the light incident on the liquid lens array 51, the light incident on the portion indicated by the dotted line 53 does not pass through the cavities 41 of the liquid lenses 1-4 to 1-6, but is blocked as indicated by the arrows shown in FIG. 2B. Therefore, light transmittance of the entire liquid lens array 51 could be reduced.

Figure 2C:
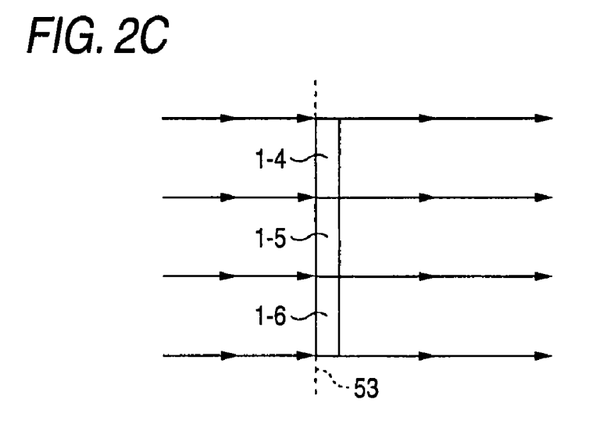

Even when the portion other than the cavity 41 of each of the liquid lenses 1 is made of a material transparent to light, among the light incident on the liquid lens array 51, the light incident on the portion indicated by the dotted line 53 does not pass through the cavities 41 of the liquid lenses 1-4 to 1-6, so that it is not focused as indicated by the arrows shown in FIG. 2C. Therefore, the light collection efficiency of the entire liquid lens array 51 could be reduced.

SUMMARY

The present disclosure is in view of such circumstances and it is desirable to provide a liquid lens that improves transmittance and light collection efficiency of an entire liquid lens array having a plurality of the liquid lenses arranged in an array.

One embodiment is directed to a liquid lens in which a voltage is applied to control the shape of the interface between a polar liquid and a nonpolar liquid so as to control a transmitted light path at the interface. The liquid lens has a cavity with a polygonal upper side, into which the polar liquid and the nonpolar liquid are injected to form the interface.

The polygonal shape of the upper side of the cavity may be a hexagon or a rectangle.

According to the embodiment, there is provided a cavity with a polygonal upper side, into which a polar liquid and a nonpolar liquid are injected to form the interface between the liquids.

Another embodiment is directed to a liquid lens in which a voltage is applied to control the shape of the interface between a polar liquid and a nonpolar liquid so as to control a transmitted light path at the interface. The liquid lens has a cavity with a polygonal upper side, into which the polar liquid and the nonpolar liquid are injected to form the interface. A plurality of such small liquid lenses are arranged in an array.

The polygonal shape of the upper side of the cavity may be a hexagon or a rectangle.

Adjacent ones of the small liquid lenses can share an electrode for applying a voltage to the polar liquid and the nonpolar liquid.

According to the other embodiment, there is provided a cavity with a polygonal upper side, into which a polar liquid and a nonpolar liquid are injected to form the interface between the liquids, and a plurality of small liquid lenses having such cavities are arranged in an array.

According to one embodiment, light can be focused. In particular, transmittance and light collection efficiency can be improved.

Additional features and advantages are described herein, and will be apparent from, the following Detailed Description and the figures.

DETAILED DESCRIPTION

One embodiment is directed to a liquid lens (the liquid lens shown in FIG. 3A, for example) in which a voltage is applied to control the shape of the interface (the interface shown in FIG. 5B, for example) between a polar liquid and a nonpolar liquid (the polar liquid and the nonpolar liquid shown in FIG. 3B, for example) so as to control a transmitted light path at the interface. The liquid lens has a cavity (the cavity shown in FIG. 3A, for example) with a polygonal upper side, into which the polar liquid and the nonpolar liquid are injected to form the interface.

Figure 8A:
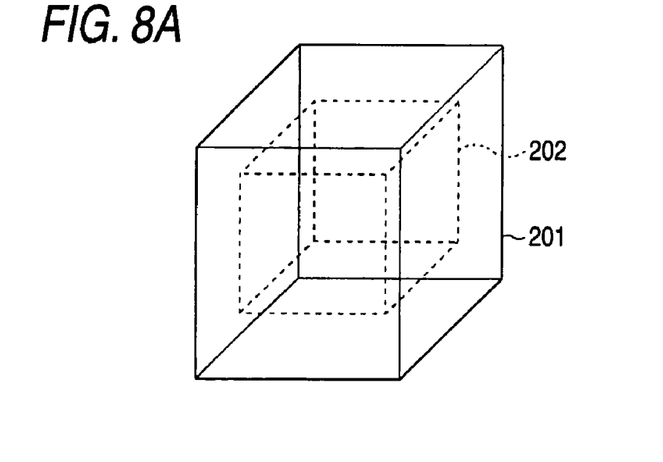
FIGS. 8A to 8C show another exemplary configuration according to one embodiment of the liquid lens.
Figure 8B:
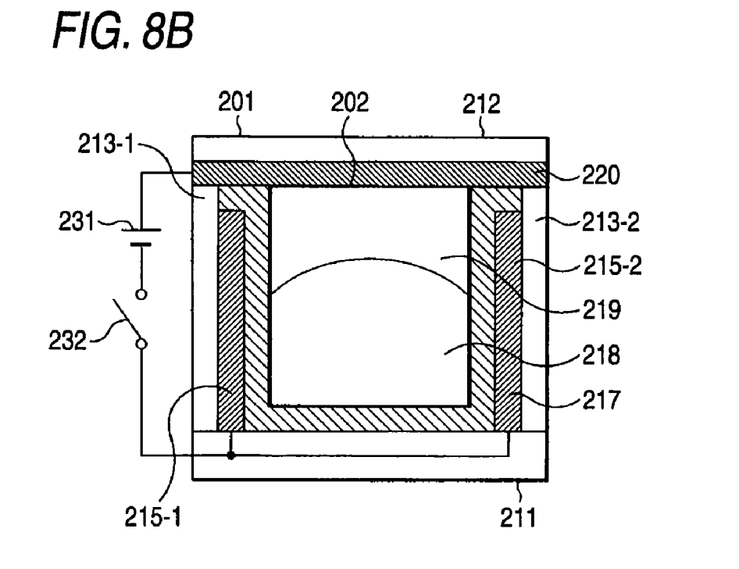

The polygonal shape of the upper side of the cavity may be a hexagon (the cavity shown in FIG. 3B, for example) or a rectangle (the cavity shown in FIG. 8B, for example).

Another embodiment is directed a liquid lens (a liquid lens array shown in FIG. 7, for example) in which a voltage is applied to control the shape of the interface between a polar liquid and a nonpolar liquid so as to control a transmitted light path at the interface. The liquid lens has a cavity (the cavity shown in FIG. 3A, for example) with a polygonal upper side, into which the polar liquid and the nonpolar liquid (the polar liquid and the nonpolar liquid shown in FIG. 3B, for example) are injected to form the interface (the interface shown in FIG. 5B, for example). A plurality of such small liquid lenses (the liquid lens shown in FIG. 3A, for example) are arranged in an array.

The polygonal shape of the upper side of the cavity may be a hexagon (the cavity shown in FIG. 3B, for example) or a rectangle (the cavity shown in FIG. 8B, for example).

Adjacent ones of the small liquid lenses can share an electrode (the lower electrode shown in FIG. 3B, for example) for applying a voltage to the liquids.

Embodiments will be described below with reference to the figures.

Figure 3A:
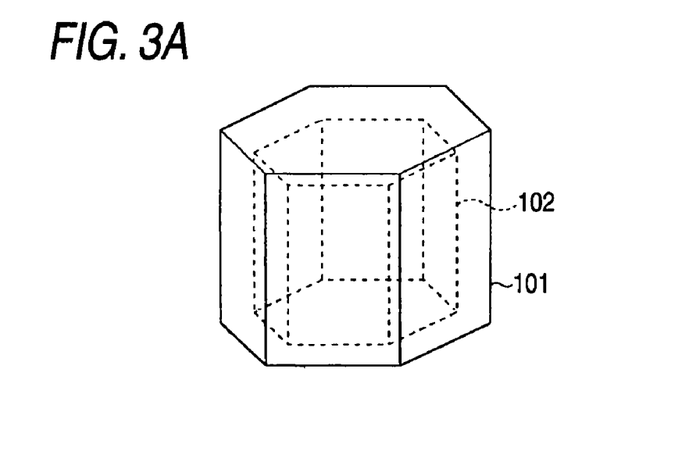
FIGS. 3A to 3C show an exemplary configuration according to one embodiment of the liquid lens.
Figure 3B:
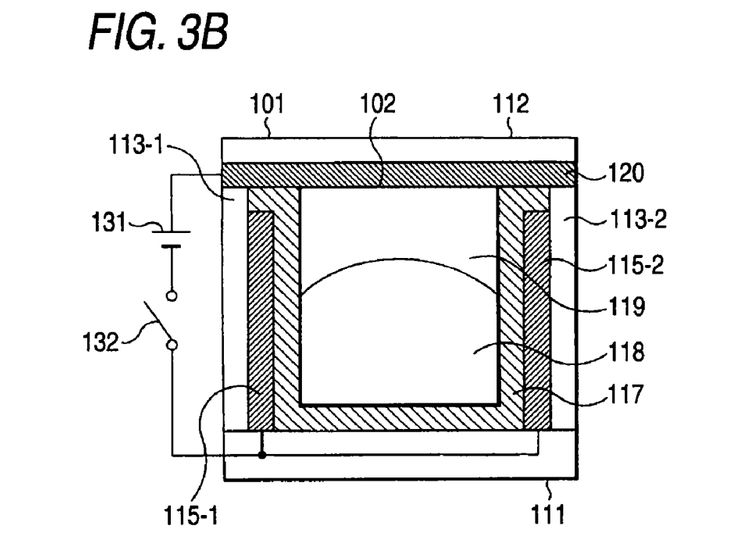
Figure 3C:
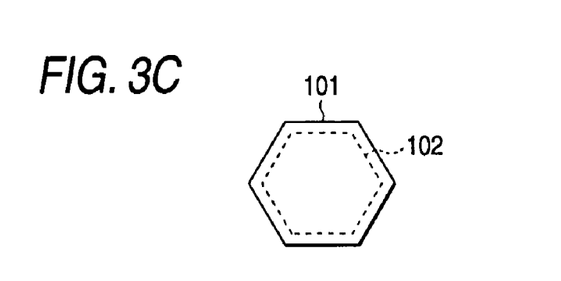

FIGS. 3A to 3C show an exemplary configuration according to one embodiment of the liquid lens.

FIG. 3A is a perspective view of the liquid lens. The liquid lens 101 shown in FIG. 3A is a lens that has a cavity 102 formed by sidewalls and the like, as described later, and uses the shape of the interface between two liquids (a polar liquid, i.e., a liquid having a polarity, and a nonpolar liquid, i.e., a liquid having no polarity, for example), which are injected into the cavity 102 and sealed with a top plate from above in the figure, to control a light path for transmitted light that transmits (the cavity 102 of) the liquid lens 101 in the vertical direction in the figure. That is, the liquid lens 101 focuses or spreads out the transmitted light that transmits the interface between the two liquids. For example, when the shape of the interface acts as a convex lens to the transmitted light (for example, as described later, when a voltage is applied between the electrodes), the transmitted light is focused to a focal point situated at a position defined by the shape of the interface. On the other hand, for example, when the shape of the interface acts as a concave lens to the transmitted light (for example, as described later, when no voltage is applied between the electrodes), the transmitted light diverges over a range defined by the shape of the interface. As shown in FIG. 3A, the shape of the liquid lens 101 is a hexagonal column formed of six flat sides. As indicated by the dotted line shown in FIG. 3A, the sides of the cavity 102 is also formed of six flat surfaces (the cavity 102 is the space inside the hexagonal column).

FIG. 3B is a cross-sectional view of the liquid lens 101 shown in FIG. 3A when viewed from the direction perpendicular to a side. In FIG. 3B, the liquid lens 101 includes a transparent substrate 111, a transparent top plate 112, sidewalls 113-1 and 113-2, lower electrodes 115-1 and 115-2, an insulating film 117, a nonpolar liquid 118, a polar liquid 119 and an upper electrode 120.

The transparent substrate 111 and the transparent top plate 112 are, for example, made of a light-transmittable transparent material, specifically, such as quartz glass. Alternatively they may be made of synthetic resins, specifically, including ester, such as polyethylene naphthalate, polyethylene terephthalate and polycarbonate; cellulose ester, such as cellulose acetate; fluoropolymer, such as a copolymer of polyvinylidene difluoride or polytetrafluoroethylene and hexafluoropropylene; polyether, such as polyoxymethylene; polyolefin, such as polyacetal, polystyrene, polyethylene, polypropylene and methylpentene polymer; polyimide, such as polyamide-imide or polyetherimide; and polyamide.

The sidewalls 113-1 and 113-2 shown in FIG. 3B are part of six sides of the liquid lens 101, as shown in FIG. 3A, and are members for sealing the nonpolar liquid 118 and the polar liquid 119. The sidewalls 113-1 and 113-2 desirably do not dissolve in or react with the nonpolar liquid 118 and polar liquid 119, for example, as in the case of epoxy-based and acryl-based resin. Accordingly, polymer resins, such as epoxy-based and acryl-based resins, are typically used. In the following description, when the sidewalls 113-1 and 113-2 do not need to be distinguished from each other, each of them is referred to as a sidewall 113.

Each of the lower electrodes 115-1 and 115-2 is an electrode formed inside the sidewall 113 (between the sidewall 113 and the insulating film 117), as shown in FIG. 3B. In the following description, when the lower electrodes 115-1 and 115-2 do not need to be distinguished from each other, each of them is referred to as a lower electrode 115. As shown in FIG. 3A, the sidewalls 113 are formed of six flat surfaces. As in the case of the sidewalls 113, six flat lower electrodes 115 surround the sides of the cavity 102. The lower electrode 115 is made of, for example, gold (Au), platinum (Pt), chromium (Cr), aluminum (Al), cobalt (Co), palladium (Pd), bismuth (Bi), silver (Ag) or an alloy thereof. Alternatively, the lower electrode 115 may be a transparent electrode formed a transparent conductive film with both high transparency and high conductivity, such as a thin film made of tin oxide ($SnO_2$) containing a trace of fluorine or a thin film made of indium tin oxide (ITO) containing a trace of antimony.

The upper electrode 120 is an electrode that is formed on the lower side of the transparent top plate 112 and corresponds to the lower electrode 115. As the material of the upper electrode 120 is basically same as that of the lower electrode 115, detailed description thereof will be omitted. As shown in FIG. 3B, part of the lower side (the central portion) of the upper electrode 120 is the upper side of the cavity 102 (the upper inner side of the liquid lens 101).

As shown in FIG. 3B, the upper electrode 120 and the lower electrode 115 are insulated from each other at least by the insulating film 117. The upper electrode 120 and the lower electrode 115 act as a pair and a predetermined voltage is applied between these electrodes as necessary. That is, as shown in FIG. 3B, a power supply 131 and a switch 132 are connected between the upper electrode 120 and the lower electrode 115. When the switch 132 is turned on, a voltage from the power supply 130 is applied between the upper electrode 120 and the lower electrode 115.

The shape and the number of each of the upper electrode 120 and the lower electrode 115 are arbitrarily selected.

The insulating film 117 is a film made of a low-conductivity substance, including a fluoropolymer, such as PVdF and PTFE, polyparaxylene and polymonochloroparaxylene, and is formed such that it covers the lower electrodes 115 and the transparent substrate 111. That is, the surface of the insulating film 117 is the sides and bottom of the cavity 102 (the inner sides and bottom of the liquid lens 101). The material of the insulating film 117 is desirably a substance with high hydrophobicity (water repellency) and high relative permittivity. The film thickness of the insulating film 117 is desirably thin in terms of high relative permittivity, while it is desirably thick in terms of high insulating strength. The optimum thickness will be therefore determined in consideration of balance between these properties. The insulating film 117 only needs to be formed of at least one layer, but may be formed of a plurality of layers, such as two or three layers. Also, the insulating film 117 only needs to be formed to cover at least the lower electrodes 115 (insulate the lower electrodes 115 from the upper electrode 120), and does not necessarily need to cover the transparent substrate 111 as shown in FIG. 3B.

The insulating film 117 contributes to a lower operation voltage and a higher operation rate. For example, if the insulating film 117 is not provided, application of a voltage will cause a decomposition reaction of water and generate gas. To prevent the gas generation, it may be required to further provide a reference electrode to form a three-electrode structure, so as to limit the potential of the lower electrode 115 to a value that does not cause the decomposition reaction of water. However, such a three-electrode structure results in a complex manufacturing process and increased manufacturing cost. Moreover, a control circuit for such a structure will be extremely complex, so that the circuit size and manufacturing costs are also undesirably increased.

On the other hand, when the insulating film 117 is provided as shown in FIG. 3B, the lower electrodes 115 are structurally insulated from the upper electrode 120, so that application of a high voltage will not cause water decomposition. This therefore imparts various advantages to the liquid lens 101, such as a simpler structure and an easier control method, decreased cost, and application of a high voltage without a concern of water decomposition, allowing an increased electrowetting force and faster focus control.

The material used for the nonpolar liquid 118 includes hydrocarbon-based materials, such as decane, dodecane, hexadecane and undecane; silicon oils having high refractive indices; and 1,1-diphenylethylene. The material used for the polar liquid 119 includes water; an aqueous solution of an electrolyte, such as potassium chloride and sodium chloride; and alcohol, such as low molecular-weight methyl alcohol and ethyl alcohol.

Although liquids other than those listed above may be used as the nonpolar liquid 118 and the polar liquid 119, the polar liquid 119 preferably has the following properties: as large of a change in wettability as possible with respect to the insulating film 117 in response to voltage application between the upper electrode 120 and the lower electrode 115, ability to separate the upper electrode 120 and the lower electrode 115, a different refractive index from that of the nonpolar liquid 118 and low viscosity.

In the liquid lens 101 thus configured, the six flat sidewalls 113 surround the sides of the cavity 102 such that the upper side of the cavity 102 has a hexagonal shape. That is, the shape of the liquid lens 101 when viewed from above (from the transparent top plate 112 side) is a hexagon as indicated by the solid line shown in FIG. 3C, and the shape of the upper side of the cavity 102 is also a hexagon as indicated by the dotted line.

In the liquid lens 101, when the switch 132 shown in FIG. 3B is open (turned off), no voltage is applied between the upper electrode 120 and the lower electrode 115. The polar liquid 119 and the nonpolar liquid 118 are then balanced into a predetermined shape shown in FIG. 3B based on respective wettability (surface energy) with respect to the insulating film 117. In this state, for example, when the central portion of the interface between the polar liquid 119 and the nonpolar liquid 118 is balanced into a shape recessed relative to the periphery (bent on the side on which transmitted light is incident), the interface acts as a concave lens to transmitted light that transmits the cavity 102 of the liquid lens 101 in the bottom-to-top direction in the figure. The transmitted light then exits from the liquid lens 101 and diverges at an angle defined by the curvature of the interface.

When the switch 132 shown in FIG. 3B is closed (turned on), a voltage is applied between the upper electrode 120 and the lower electrode 115, so that polarized charges are generated in the insulating film 117 in the electric field direction and the charges are accumulated at the surface of the insulating film 117 (charge double-layer state). The presence of the charges generates a Coulomb force only in the polar liquid 119, for example, in the direction in which the charges are attracted to the vicinity of the insulating film 117. That is, the voltage application between the electrodes changes the wettability of the polar liquid 119 with respect to the insulating film 117. As a result, for example, the contact area between the polar liquid 119 and the insulating film 117 increases, while the contact area between the nonpolar liquid 118 and the insulating film 117 decreases accordingly. This deforms the interface between the nonpolar liquid 118 and the polar liquid 119 and hence changes the curvature of the interface.

The change in curvature of the interface changes the light path for transmitted light that transmits the cavity 102 of the liquid lens 101 in the bottom-to-top direction in the figure. For example, when the central portion of the interface is balanced into a shape protruding relative to the periphery (bent on the side from which transmitted light exits), the interface acts as a convex lens to the transmitted light. The transmitted light then exits from the liquid lens 101 and is focused to a focal point defined by the curvature of the interface. Since the shape of the upper side of the cavity 102 is hexagonal (polygonal), the length from the sidewall 113 to the central point of the upper side varies depending on the position on the sidewall 113. Variation in this length changes the curvature of the interface between the nonpolar liquid 118 and the polar liquid 119 depending on locations, resulting in a distorted lens, which could shift the focused point of the transmitted light or could not focus it at all.

Figure 4:
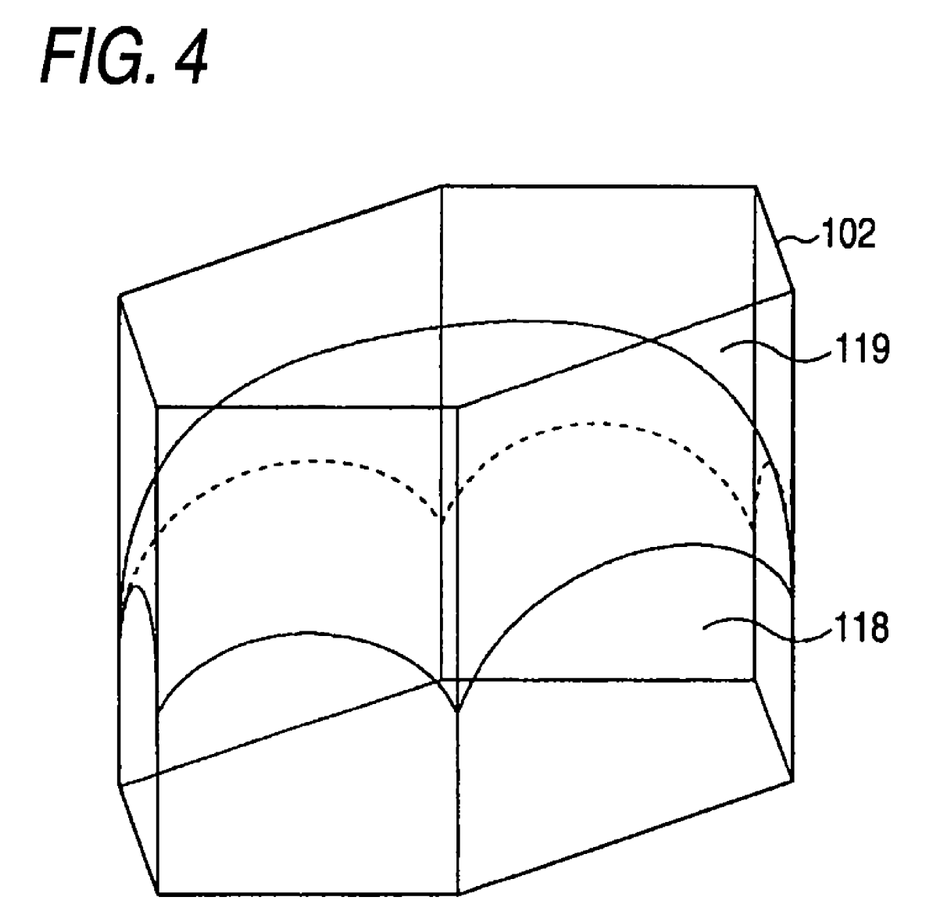
FIG. 4 explains an example how the interface changes when a voltage is applied to the liquid lens shown in FIGS. 3A to 3C.

In practice, however, high surface tensions of the nonpolar liquid 118 and the polar liquid 119 act such that the curvature of the interface becomes approximately constant, resulting in approximately constant curvature of the interface across the interface. For example, when a voltage is applied between the upper electrode 120 and the lower electrode 115 such that the contact area between the polar liquid 119 and the insulating film 117 increases, the surface tension of the polar liquid 119 tries to extend the polar liquid 119 along the portion of the side insulating film 117 that corresponds to the apex of the hexagonal upper side of the cavity 102, as shown in FIG. 4. Therefore, the interface between the nonpolar liquid 118 and the polar liquid 119 is shaped into an arc on each of the six flat surfaces of the side insulating film 117.

As described above, the curvature of the interface between the nonpolar liquid 118 and the polar liquid 119 is approximately constant independent of the position.

Figure 5A:
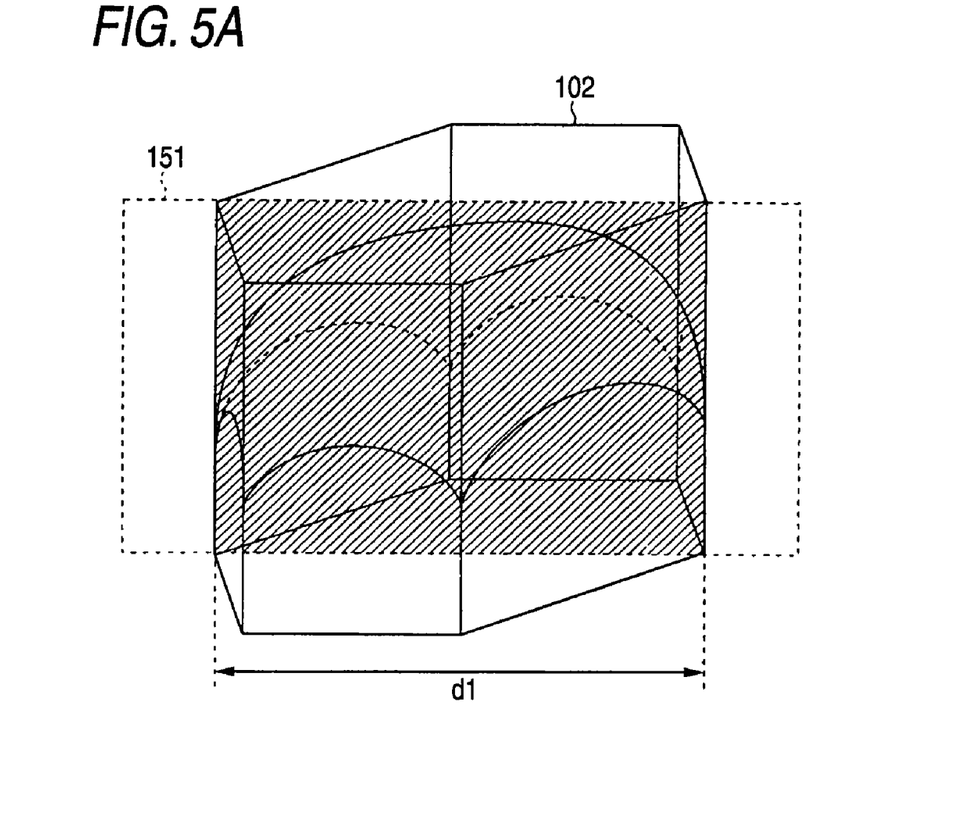
FIGS. 5A and 5B explain curvature of the interface in the liquid lens shown in FIGS. 3A to 3C.
Figure 5B:
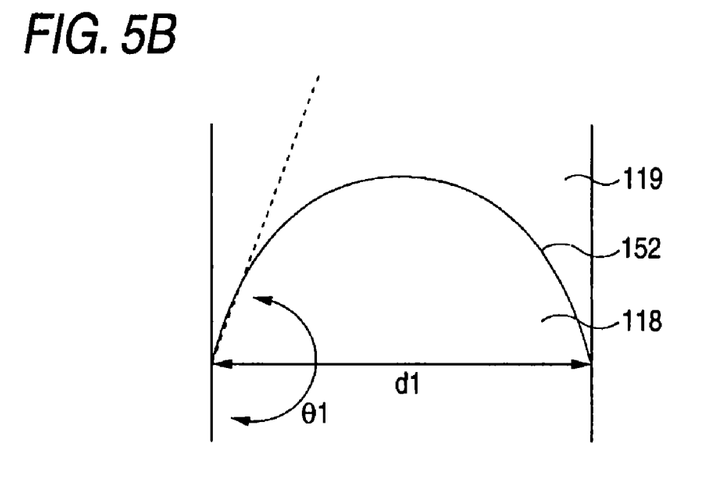

A more specific description is given below. For example, as shown in FIG. 5A, in a vertical cross section 151 of the cavity 102 taken along a diagonal of the hexagonal upper side of the cavity 102, the interface 152 between the nonpolar liquid 118 and the polar liquid 119 is shown in FIG. 5B. Let d1 be the horizontal length (length of the diagonal of the hexagon) of the cross section 151 and θ1 be the contact angle between the insulating film 117 and the interface 152.

Figure 6A:
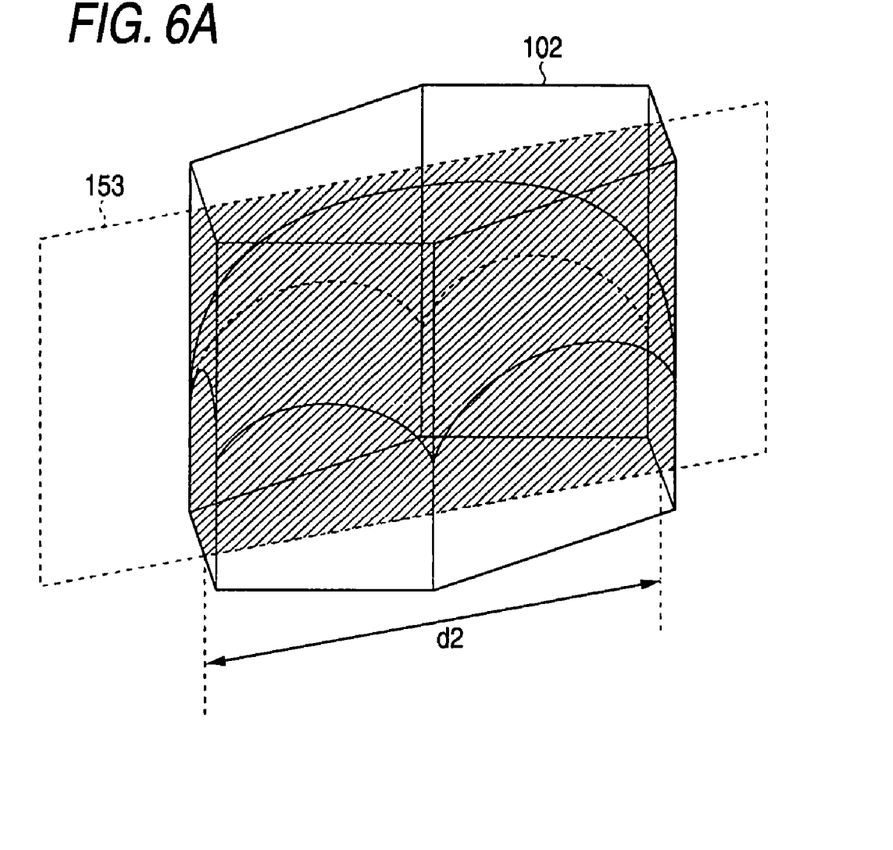
FIGS. 6A and 6B explain curvature of the interface in the liquid lens shown in FIGS. 3A to 3C.
Figure 6B:
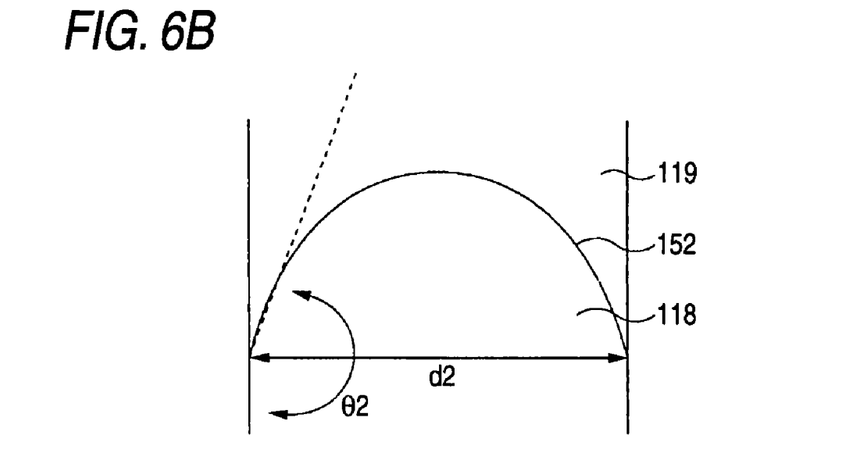

For example, as shown in FIG. 6A, in a vertical cross section 153 of the cavity 102 taken along a plane passing through the midpoints of two flat opposing surfaces of the insulating film 117, the interface 152 between the nonpolar liquid 118 and the polar liquid 119 is shown in FIG. 6B. Let d2 be the horizontal length of the cross section 153 and θ2 be the contact angle between the insulating film 117 and the interface 152.

Although the contact angles θ1 and θ2 have the same value, the lengths d1 and d2 are different from each other, so that the radius of curvature of the interface in FIGS. 5A and 5B could differ from that in FIGS. 6A and 6B. For example, when d1=1 mm, d2=1.32 mm and θ=130°, the radius of curvature R1 of the interface 152 in FIGS. 5A and 5B is 0.78 mm, while the radius of curvature R2 of the interface 152 in FIGS. 6A and 6B is 1.03 mm. Therefore, curvature of the interface 152 in FIGS. 5A and 5B is approximately the same as that in FIGS. 6A and 6B with no substantial difference. Furthermore, a high surface tension acts on the interface 152 as described above and has a dominant effect on the shape of the interface 152. Accordingly, the curvature of the interface 152 is approximately constant independent of the position.

That is, the liquid lens 101 having the cavity 102 with such a hexagonal upper side can also exhibit sufficient lens characteristics as in the case of the liquid lens of the related art having a cavity with a circular upper side. Furthermore, since the cavity 102 of the liquid lens 101 has a polygonal (hexagonal) upper side, the liquid lens 101 can also have a polygonal (hexagonal) outer upper side in agreement with the cavity 102, so that the area of the liquid lens 101 other than the cavity 102 when viewed from above can be reduced and hence the cavity 102 (lenticular interface) can occupy substantially all of the upper side. That is, the liquid lens 101 has improved transmittance and light collection efficiency for transmitted light.

Figure 7:
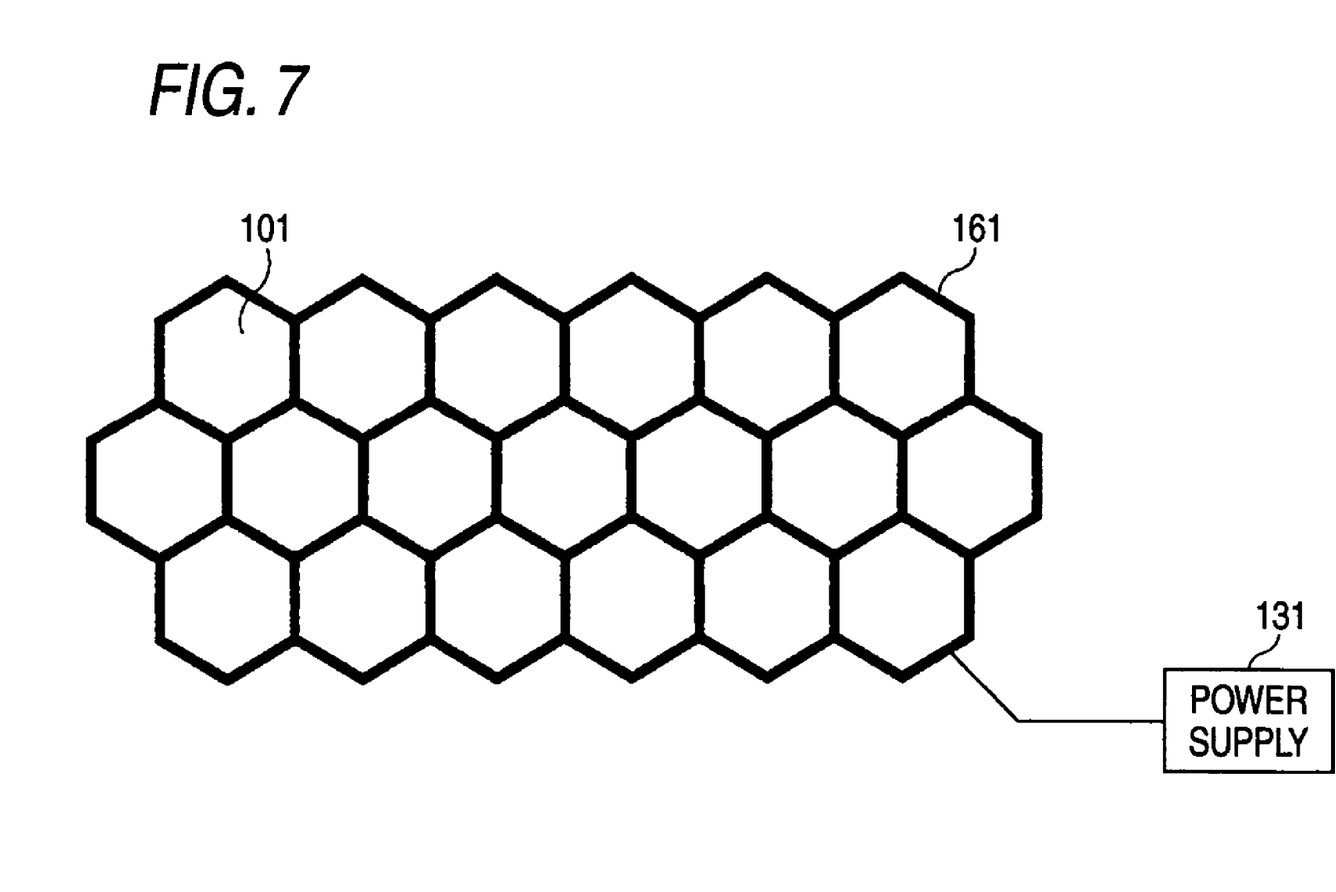
FIG. 7 shows an exemplary configuration of a liquid lens array using the liquid lens shown in FIGS. 3A to 3C.

Liquid lenses 101 can be arranged in an array to form a liquid lens array 161, as shown in FIG. 7. The liquid lens array 161 is a liquid lens formed of an assembly of small liquid lenses (liquid lenses 101) arranged in an array. Each of the liquid lenses 101 of the liquid lens array 161 has a polygonal upper side, so that a close-packed structure with very little gap between the lenses can be formed, as shown in FIG. 7. Therefore, the liquid lens array 161 with the liquid lenses 101 arranged in an array shown in FIG. 7 has an improved transmittance and light collection efficiency for transmitted light.

In the liquid lens array 161 shown in FIG. 7, for example, the sidewall 113 may be omitted and an adjacent pair of liquid lenses 101 may share one lower electrode 115. In this way, not only can the number of components in each liquid lens 101 be reduced, but also the lower electrodes 115 of all liquid lenses 101 in the liquid lens array 161 can be connected to the power supply 131 only by connecting the lower electrode 115 of one of the liquid lenses 101 in the liquid lens array 161 to the power supply 131, allowing the number of components, such as wiring lines, to be further reduced.

This can therefore further reduce the size of the liquid lens array 161 and its manufacturing cost as well.

The shape of the upper side of the cavity 102 of the liquid lens 101 may not be a hexagon but other polygons. For example, the shape of the upper side of the cavity 102 may be a rectangle, as shown in FIGS. 8A to 8C.

Figure 8C:
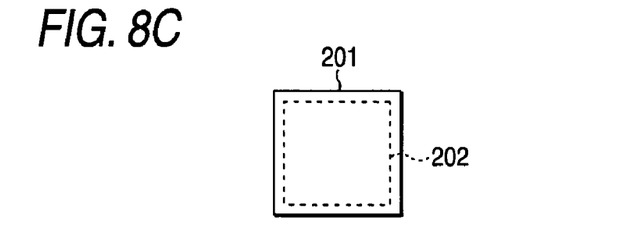

FIGS. 8A to 8C show another exemplary configuration according to one embodiment of the liquid lens.

FIG. 8A is a perspective view of the liquid lens. The liquid lens 201 shown in FIG. 8A is a lens, as in the case of the liquid lens 101, that has a cavity 202 formed by sidewalls and the like and uses the shape of the interface between two liquids (a polar liquid, i.e., a liquid having a polarity, and a nonpolar liquid, i.e., a liquid having no polarity, for example), which are injected into the cavity 202 and sealed with a top plate from above in the figure, to control a light path for transmitted light that transmits (the cavity 202 of) the liquid lens 201 in the vertical direction in the figure. That is, the liquid lens 201 focuses or spreads out the transmitted light that transmits the interface between the two liquids. For example, when the shape of the interface acts as a convex lens to the transmitted light (for example, as described later, when a voltage is applied between the electrodes), the transmitted light is focused to a focal point situated at a position defined by the shape of the interface. On the other hand, for example, when the shape of the interface acts as a concave lens to the transmitted light (for example, as described later, when no voltage is applied between the electrodes), the transmitted light diverges over a range defined by the shape of the interface. As shown in FIG. 8A, the shape of the liquid lens 201 is a rectangular column formed of four flat sides. As indicated by the dotted line shown in FIG. 8A, the sides of the cavity 202 is also formed of four flat surfaces (the cavity 202 is the space inside the rectangular column).

FIG. 8B is a cross-sectional view of the liquid lens 201 shown in FIG. 8A when viewed from the direction perpendicular to a side. In FIG. 8B, the liquid lens 201 basically has a configuration similar to that of the liquid lens 101, and includes a transparent substrate 211, a transparent top plate 212, sidewalls 213-1 and 213-2, lower electrodes 215-1 and 215-2, an insulating film 217, a nonpolar liquid 218, a polar liquid 219 and an upper electrode 220.

The transparent substrate 211 is made of a material similar to that of the transparent substrate 111. The transparent top plate 212 is also made of a material similar to that of the transparent top plate 112. The sidewalls 213-1 and 213-2 are part of four sides of the liquid lens 201, as shown in FIG. 8A, and are members for sealing the nonpolar liquid 218 and the polar liquid 219. The sidewalls 213-1 and 213-2 are made of a material similar to that of the sidewall 113. In the following description, when the sidewalls 213-1 and 213-2 do not need to be distinguished from each other, each of them is referred to as a sidewall 213.

Each of the lower electrodes 215-1 and 215-2 is an electrode made of a material similar to that of the lower electrode 115 and formed inside the sidewall 213 (between the sidewall 213 and the insulating film 217), as shown in FIG. 8B. In the following description, when the lower electrodes 215-1 and 215-2 do not need to be distinguished from each other, each of them is referred to as a lower electrode 215. As shown in FIG. 8A, the sidewalls 213 are formed of four flat surfaces. As in the case of the sidewalls 213, four flat lower electrodes 215 surround the sides of the cavity 202.

The upper electrode 220 is an electrode that is formed on the lower side of the transparent top plate 212 and corresponds to the lower electrode 215. The upper electrode 220 is made of a material similar to that of the upper electrode 120. As shown in FIG. 8B, part of the lower side (the central portion) of the upper electrode 220 is the upper side of the cavity 202 (the upper inner side of the liquid lens 201).

As shown in FIG. 8B, the upper electrode 220 and the lower electrode 215 are insulated from each other at least by the insulating film 217. The upper electrode 220 and the lower electrode 215 act as a pair and a predetermined voltage is applied between these electrodes as necessary. That is, as shown in FIG. 8B, a power supply 231 and a switch 232 are connected between the upper electrode 220 and the lower electrode 215. When the switch 232 is turned on, a voltage from the power supply 230 is applied between the upper electrode 220 and the lower electrode 215.

The shape and the number of each of the upper electrode 220 and the lower electrode 215 are arbitrarily selected.

The insulating film 217 is a film made of a material similar to that of the insulating film 117 and is formed such that it covers the lower electrodes 215 and the transparent substrate 211, providing an effect similar to that of the insulating film 117. The insulating film 217 only needs to be formed to cover at least the lower electrodes 215 (insulate the lower electrodes 215 from the upper electrode 220), and does not necessarily need to cover the transparent substrate 211, as shown in FIG. 8B.

A liquid similar to the nonpolar liquid 118 is used for the nonpolar liquid 218. A liquid similar to the polar liquid 119 is used for the nonpolar liquid 219.

In the liquid lens 201 thus configured, the four flat sidewalls 213 surround the sides of the cavity 202 such that the upper side of the cavity 202 has a rectangular shape. That is, the shape of the liquid lens 201 when viewed from above (from the transparent top plate 212 side) is a rectangle as indicated by the solid line shown in FIG. 8C, and the shape of the upper side of the cavity 202 is also a rectangle as indicated by the dotted line.

In the liquid lens 201, when the switch 232 shown in FIG. 8B is open (turned off), no voltage is applied between the upper electrode 220 and the lower electrode 215. The polar liquid 219 and the nonpolar liquid 218 are then balanced into a predetermined shape shown in FIG. 8B based on respective wettability (surface energy) with respect to the insulating film 217. In this state, for example, when the central portion of the interface between the polar liquid 219 and the nonpolar liquid 218 is balanced into a shape recessed relative to the periphery (bent on the side on which transmitted light is incident), the interface acts as a concave lens to transmitted light that transmits the cavity 202 of the liquid lens 201 in the bottom-to-top direction in the figure. The transmitted light then exits from the liquid lens 201 and diverges at an angle defined by the curvature of the interface.

When the switch 232 shown in FIG. 8B is closed (turned on), as in the case of the liquid lens 101, a voltage is applied between the upper electrode 220 and the lower electrode 215, so that polarized charges are generated in the insulating film 217 in the electric field direction and the charges are accumulated at the surface of the insulating film 217 (charge double-layer state). The presence of the charges generates a Coulomb force only in the polar liquid 219, for example, in the direction in which the charges are attracted to the vicinity of the insulating film 217. That is, the voltage application between the electrodes changes the wettability of the polar liquid 219 with respect to the insulating film 217. As a result, for example, the contact area between the polar liquid 219 and the insulating film 217 increases, while the contact area between the nonpolar liquid 218 and the insulating film 217 decreases accordingly. This deforms the interface between the nonpolar liquid 218 and the polar liquid 219 and hence changes the curvature of the interface.

The change in curvature of the interface changes the light path for transmitted light that transmits the cavity 202 of the liquid lens 201 in the bottom-to-top direction in the figure. For example, when the central portion of the interface is balanced into a shape protruding relative to the periphery (bent on the side from which transmitted light exits), the interface acts as a convex lens to the transmitted light. The transmitted light then exits from the liquid lens 201 and is focused to a focal point defined by the curvature of the interface. Since the shape of the upper side of the cavity 202 is rectangular (polygonal), the length from the sidewall 213 to the central point of the upper side varies depending on the position on the sidewall 213. Variation in this length changes the curvature of the interface between the nonpolar liquid 218 and the polar liquid 219 depending on locations, resulting in a distorted lens, which could shift the focused point of the transmitted light or could not focus it at all.

Figure 9:
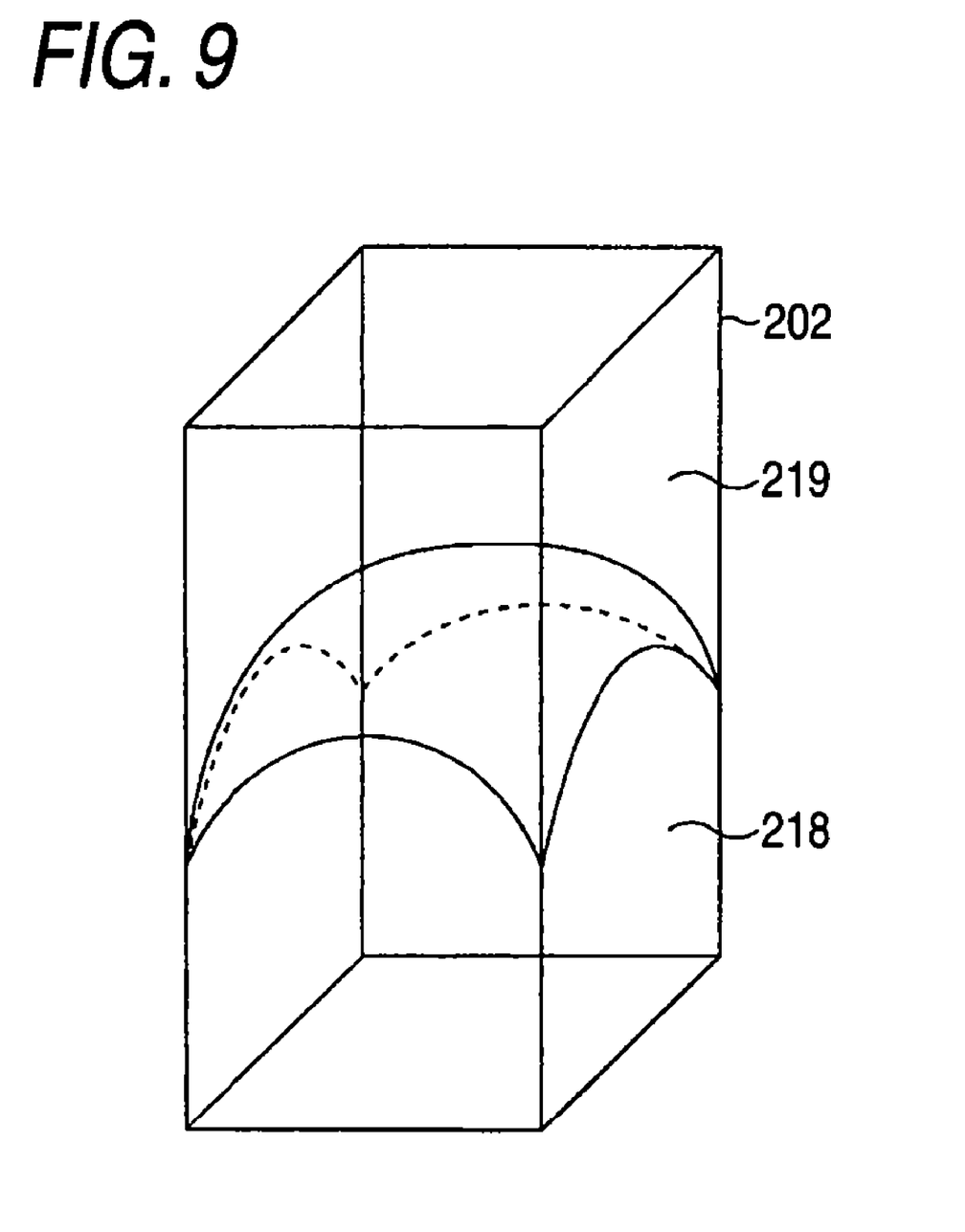
FIG. 9 explains an example how the interface changes when a voltage is applied to the liquid lens shown in FIGS. 8A to 8C.

In practice, however, again in the case of the liquid lens 202, high surface tensions of the nonpolar liquid 218 and the polar liquid 219 act such that the curvature of the interface becomes approximately constant, resulting in approximately constant curvature of the interface across the interface. For example, when a voltage is applied between the upper electrode 220 and the lower electrode 215 such that the contact area between the polar liquid 219 and the insulating film 217 increases, the surface tension of the polar liquid 219 tries to extend the polar liquid 219 along the portion of the side insulating film 217 that corresponds to the apex of the rectangular upper side of the cavity 202, as shown in FIG. 9. Therefore, the interface between the nonpolar liquid 218 and the polar liquid 219 is shaped into an arc on each of the four flat surfaces of the side insulating film 217.

Figure 10A:
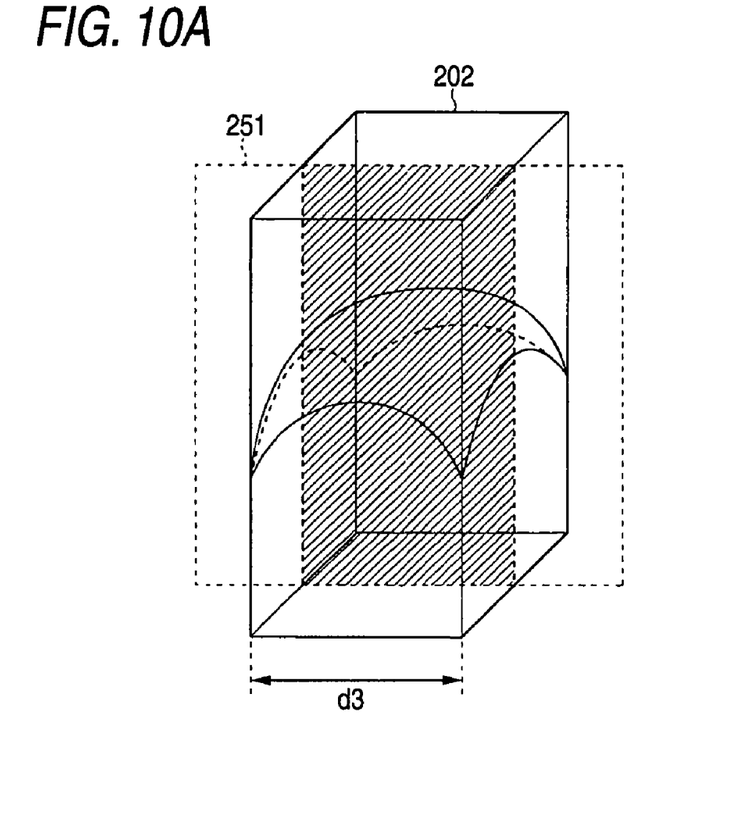
FIGS. 10A and 10B explain curvature of the interface in the liquid lens shown in FIGS. 8A to 8C.
Figure 10B:
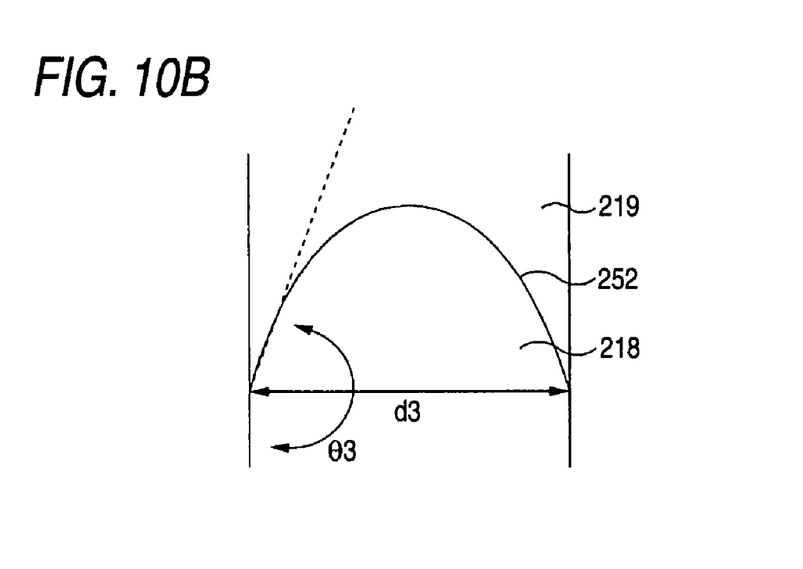

That is, for example, as shown in FIG. 10A, in a vertical cross section 251 of the cavity 202 taken along a plane passing through the midpoints of two flat opposing surfaces of the sidewalls 213, the interface 252 between the nonpolar liquid 218 and the polar liquid 219 is shown in FIG. 10B. Let d3 be the horizontal length of the cross section 253 and θ3 be the contact angle between the sidewall 213 and the interface 252.

Figure 11A:
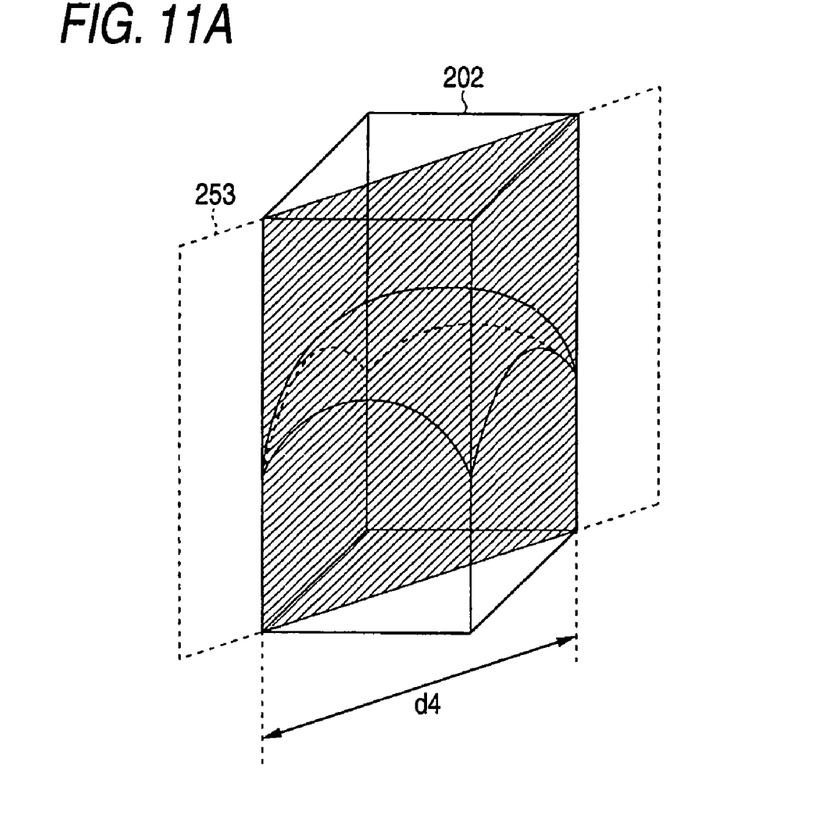
FIGS. 11A and 11B explain curvature of the interface in the liquid lens shown in FIGS. 8A to 8C.
Figure 11B:
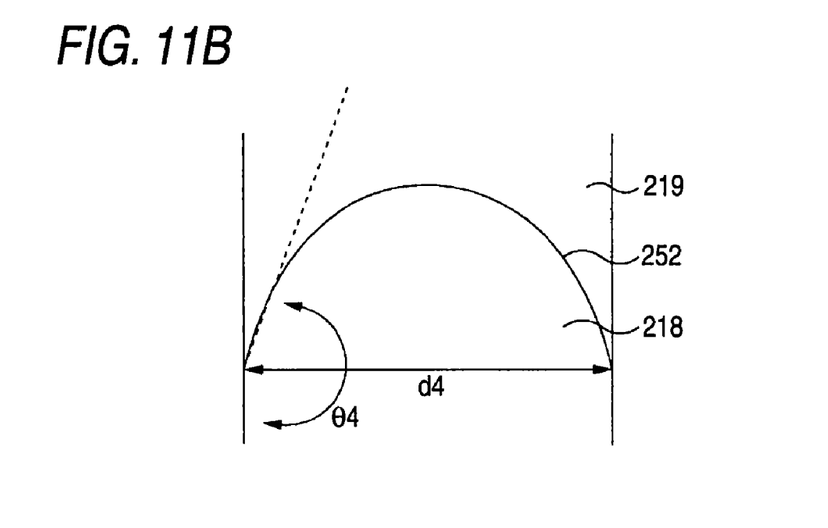

For example, as shown in FIG. 11A, in a vertical cross section 253 of the cavity 202 taken along a diagonal of the rectangular upper side of the cavity 202, the interface 252 between the nonpolar liquid 218 and the polar liquid 219 is shown in FIG. 11B. Let d4 be the horizontal length (length of the diagonal of the rectangle) of the cross section 253 and θ4 be the contact angle between the sidewall 213 and the interface 252.

Although the contact angles θ3 and θ4 have the same value, the lengths d3 and d4 are different from each other, so that the radius of curvature of the interface in FIGS. 10A and 10B may differ from that in FIGS. 11A and 11B. However, as in FIGS. 5A, 5B and 6A, 6B described above, the difference in curvature of the interface 152 is not substantial. Furthermore, a high surface tension acts on the interface 252 as described above and has a dominant effect on the shape of the interface 252. Accordingly, the curvature of the interface 252 is approximately constant independent of the position.

That is, the liquid lens 201 having the cavity 202 with such a rectangular upper side can also exhibit sufficient lens characteristics as in the case of the liquid lens of the related art having a cavity with a circular upper side. Furthermore, since the cavity 202 of the liquid lens 201 has a polygonal (rectangular) upper side, the liquid lens 201 can also have a polygonal (rectangular) outer upper side in agreement with the cavity 202, so that the area of the liquid lens 201 other than the cavity 202 when viewed from above can be reduced and hence the cavity 202 (lenticular interface) can occupy substantially all of the upper side. That is, the liquid lens 201 has improved transmittance and light collection efficiency for transmitted light.

Figure 12:
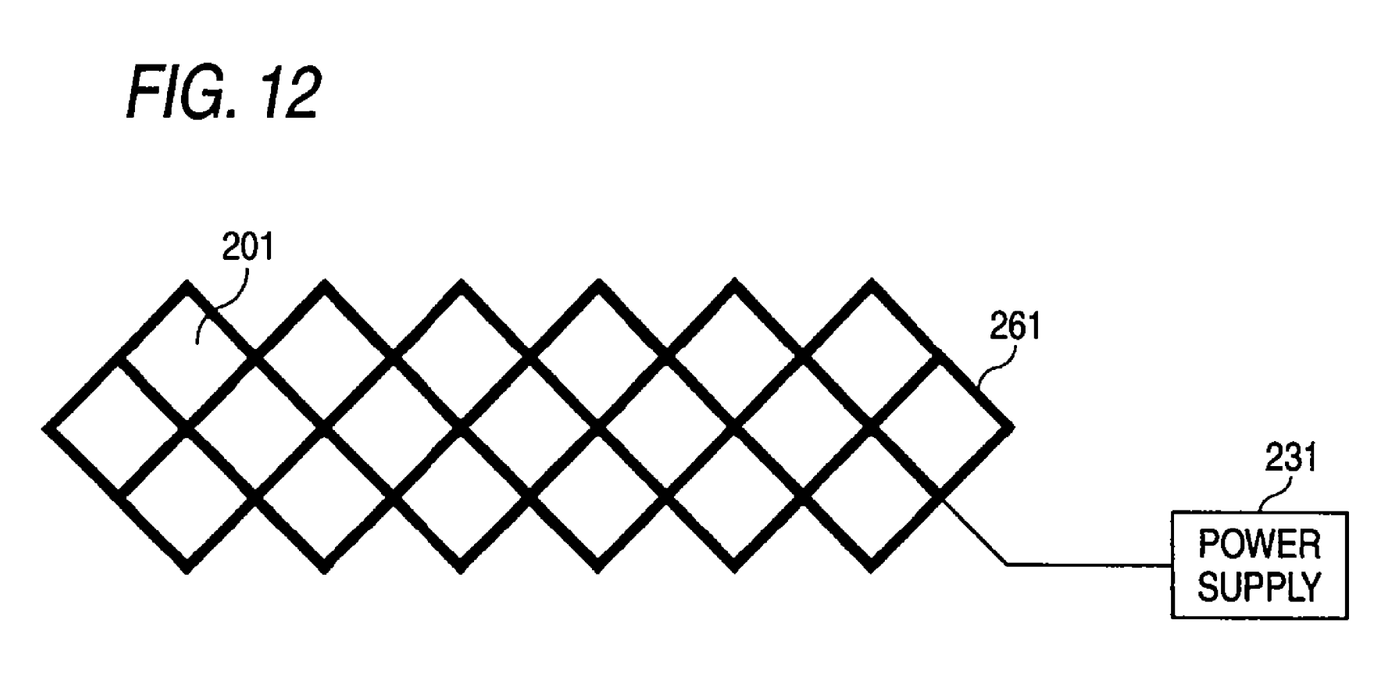
FIG. 12 shows an exemplary configuration of a liquid lens array using the liquid lens shown in FIGS. 8A to 8C.

Liquid lenses 201 can be arranged in an array to form a liquid lens array 261, as shown in FIG. 12. The liquid lens array 261 is a liquid lens formed of an assembly of small liquid lenses (liquid lenses 201) arranged in an array. Each of the liquid lenses 201 of the liquid lens array 261 has a polygonal upper side, so that a close-packed structure with very little gap between the lenses can be formed, as shown in FIG. 12. Therefore, the liquid lens array 261 with the liquid lenses 201 arranged in an array shown in FIG. 12 has an improved transmittance and light collection efficiency for transmitted light.

In the liquid lens array 261 shown in FIG. 12, for example, the sidewall 213 may be omitted and an adjacent pair of liquid lenses 201 may share one lower electrode 215. In this way, not only can the number of components in each liquid lens 201 be reduced, but also the lower electrodes 215 of all liquid lenses 201 in the liquid lens array 261 can be connected to the power supply 231 only by connecting the lower electrode 215 of one of the liquid lenses 201 in the liquid lens array 261 to the power supply 231, allowing the number of components, such as wiring lines, to be further reduced.

This can therefore further reduce the size of the liquid lens array 261 and its manufacturing cost as well.

The liquid lens array with the thus configured liquid lenses arranged in an array may also be formed such that multiple kinds of liquid lenses with differently shaped polygonal upper sides are combined. For example, liquid lenses having pentagonal upper sides and liquid lenses having hexagonal upper sides are arranged in an array in combination.

The liquid lens 101 described above only needs to be configured such that the shape of the interface between the two liquids, that is, the nonpolar liquid 118 and the polar liquid 119, changes in response to voltage application between the upper electrode 120 and the lower electrode 115. The shape (curvature) of the interface between the two liquids when no voltage is applied between the electrodes and the amount of voltage applied between the electrodes are both arbitrarily selected.

That is, for example, the voltage application between the upper electrode 120 and the lower electrode 115 of the liquid lens 101 described above may change the interface between the two liquids, that is, the nonpolar liquid 118 and the polar liquid 119, in different ways, such as from a concave shape to a convex shape, from a concave shape to a flat surface, from a concave shape to another concave shape with smaller curvature, from a flat surface to a convex shape, and from a convex shape to another convex shape with larger curvature.

Such a shape (curvature) of the interface between the two liquids and the amount of change thereof are determined by the kinds, the amounts and the temperatures of the two liquids, the size and the shape of the cavity 102 (liquid lens 101), the amount of the voltage applied between the electrodes and the like.

Similarly, the liquid lens 201 described above only needs to be configured such that the shape of the interface between the two liquids, that is, the nonpolar liquid 218 and the polar liquid 219, changes in response to voltage application between the upper electrode 220 and the lower electrode 215. The shape (curvature) of the interface between the two liquids, that is, the nonpolar liquid 218 and the polar liquid 219, when no voltage is applied between the electrodes as well as the amount of voltage applied between the electrodes are also both arbitrarily selected, as in the case of the liquid lens 101.

That is, in the case of the liquid lens 201 as well, for example, the voltage application between the upper electrode 220 and the lower electrode 215 of the liquid lens 201 described above may change the interface between the two liquids, that is, the nonpolar liquid 218 and the polar liquid 219, in different ways, such as from a concave shape to a convex shape, from a concave shape to a flat surface, from a concave shape to another concave shape with smaller curvature, from a flat surface to a convex shape, and from a convex shape to another convex shape with larger curvature.

Such a shape (curvature) of the interface between the two liquids and the amount of change thereof are determined by the kinds, the amounts and the temperatures of the two liquids, the size and the shape of the cavity 202 (liquid lens 201), the amount of the voltage applied between the electrodes and the like.

It should be appreciated that the present disclosure is not limited to the embodiments described above, but various changes can be made thereto as long as those changes do not depart from the spirit of the invention.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid lens article having a plurality of liquid lenses, for each liquid lens a voltage is applied to control a shape of an interface between a polar liquid and a nonpolar liquid so as to control a transmitted light path at the interface, the liquid lenses comprising:
    a cavity with a polygonal upper side, into which the polar liquid and the nonpolar liquid are injected to form the interface,
    wherein the plurality of the liquid lenses are the same shape and size and are arranged in an array.

2. The liquid lens article according to claim 1, wherein the polygonal shape of the upper side of the cavity is a hexagon or a rectangle.

3. The liquid lens article according to claim 1, wherein adjacent ones of the liquid lenses share an electrode for applying a voltage to the polar liquid and the nonpolar liquid.

4. The liquid lens article according to claim 1, wherein the array includes a number of rows and columns of said liquid lenses.

5. The liquid lens article according to claim 1, wherein adjacent ones of the liquid lenses share a lower electrode.

6. The liquid lens article according to claim 1, wherein each liquid lens includes
    a transparent substrate,
    a plurality of sidewalls extending vertically upward from the substrate, a plurality of lower electrodes formed on inside surfaces of the sidewalls, an upper electrode, and an insulating film formed on inside surfaces of the lower electrodes and electrically isolating the upper electrode from the lower electrodes, wherein the upper electrode defines an upper surface of the cavity, and the insulating film defines side surfaces and a lower surface of the cavity.

7. The liquid lens article according to claim 1, wherein the liquid lenses of the array are arranged in a close-packed structure.

8. The liquid lens article according to claim 7, wherein the polygonal shape of the upper side of the cavity is a hexagon, and the close-packed structure is honeycomb shaped.

* * * * *